Patented June 22, 1943

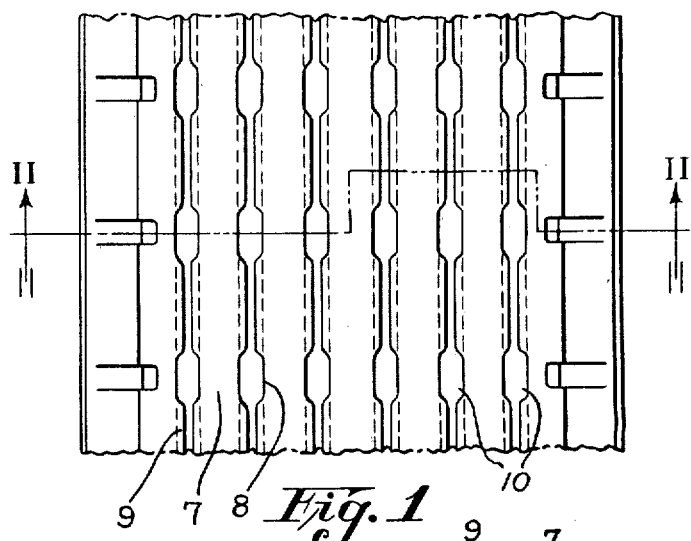
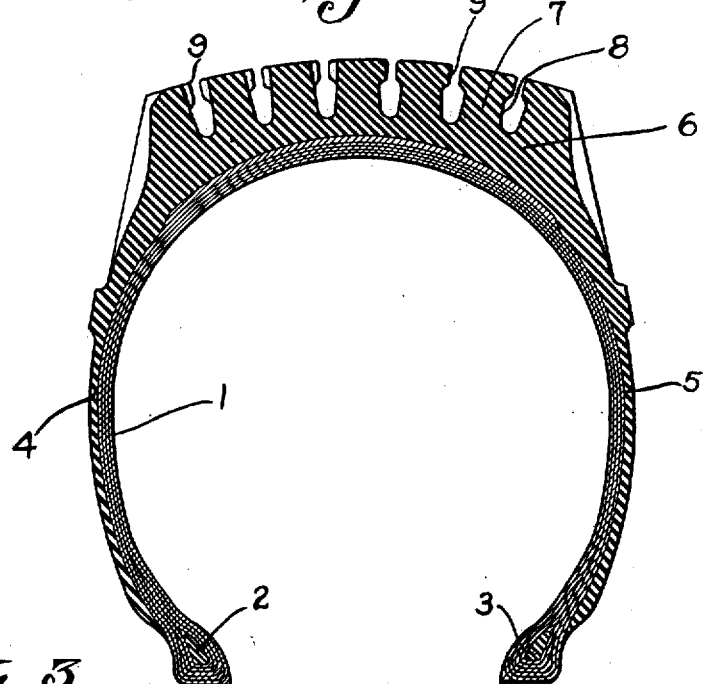
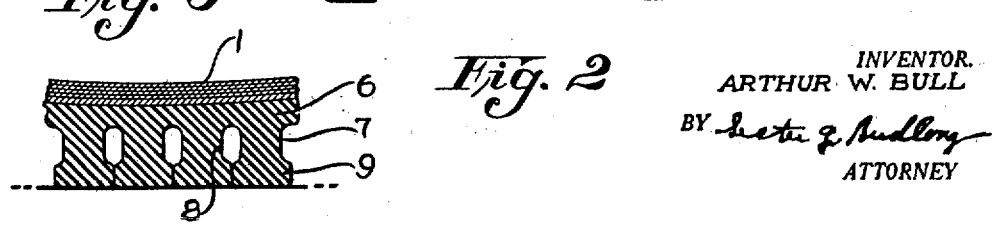

2,322,505

UNITED STATES PATENT OFFICE 2,322,505

PNEUMATIC TIRE

Arthur W. Bull, Grosse Pointe, Mich., assignor to United States Rubber Company, New York, N. Y., a corporation of New Jersey Application November 28, 1940, Serial No. 367,517

9 Claims. (Cl. 152—209)

This invention relates to pneumatic tires and, in particular, it relates to tire treads having antiskid elements proportioned to provide a substantial increase in wearing quality.

For practical purposes pneumatic tires are provided with a tread pattern which includes a plurality of antiskid elements defining adjacent grooves. The height of the antiskid elements is usually limited because an increase in height beyond that commonly used increases flexibility and results in a tire which is unstable in performance.

In accordance with the practice of my invention, I provide a pneumatic tire tread having antiskid elements of a height representing a substantial increase over conventional practices, and incorporating means with the antiskid elements for providing lateral support to increase the stability of the tire. The stabilizing means comprises lateral projections on the antiskid elements near their ground engaging surfaces of substantial thickness and extending into the grooves defined by the elements, the size and shape of these projections being such as to form contact with adjacent units when the tire is under load and in engagement with a supporting surface.

By providing such means for increasing the stability of the tires, it is possible to increase the height of their antiskid elements and to obtain an increase in the tread wearing qualities of the order of a 100 per cent., in comparison with the tread wearing qualities of conventional tires, thereby providing tires capable of functioning satisfactorily for a substantially greater mileage. It is, therefore, among the objects of my invention to provide a pneumatic tire having long wearing characteristics in combination with stability in performance.

The following description with reference to the accompanying drawing illustrates the invention in detail.

In the drawing, Fig. 1 is a plan view of a portion of a pneumatic tire, illustrating an embodiment of my invention;

Fig. 2 is a transverse view thereof, in section, taken along line II—II of Fig. 1; and Fig. 3 is a transverse view, in section, of a portion of the tire shown in Fig. 2 and illustrating the function of the tire tread while contacting a supporting surface.

Referring to the drawing, there is shown a pneumatic tire comprising a conventional carcass 1 of strain resisting elements, and inextensible beads 2 and 3. The sides of the carcass 1 are covered with layers of rubber composition 4 and 5. A tread 6 is provided on the crown portion of the carcass. This tread is divided into a plurality of antiskid elements 7 defining grooves 8. The antiskid elements, as illustrated, define a tread pattern of functionally continuous and circumferentially extending ribs. It is to be understood, however, that the present invention may be utilized with various rib type tread patterns.

A plurality of projections 9 extend laterally from the antiskid elements and into the grooves 8 as defined by the antiskid elements. These projections are of substantial thickness and lie adjacent the ground engaging surfaces of the antiskid elements. The projections 9 form a flat surface in a plane at right angles to the road surface, therefore, the thickness of the projections should be such as to provide an adequate support of adjacent antiskid elements when the units are in contacting relationship. Preferably, the radial thickness of the projections should be of the order of at least one-fourth the height of the antiskid elements.

As shown in Fig. 1, the circumferential length of the projections 9 is such that a substantial number of the projections in each row of antiskid elements will engage a supporting surface at the same time. The projections 9, in effect, form contiguous over-hanging ribs. The intermittent effect of the projections permits them to function as a traction means and also permits relatively large openings 10 in the tread pattern for the purpose of allowing for the removal of water or foreign objects from the grooves 8. The circumferential length of the projections 9 determines the number of openings 10 formed circumferentially along each of the ribs 7. In a 6.00–16 tire I have found that good results are obtained by providing projections 9 each having a circumferential length of about one inch and spaced circumferentially to form opening 10 having a length of about one-half inch. It is to be understood, however, that the projections 9 or openings 10 may be variable in length to suit a particular design, or arrangement which permits a more quiet tire operation. The width of the openings 10 is defined by the width of the tread grooves 8.

The projections 9 extend laterally into the grooves 8 a distance sufficient to permit engagement with the corresponding adjacent projection when the tire tread is under load and in contact with the supporting surface. This condition is illustrated in Fig. 3, in which all of the adjacent projections are in engagement with each other, with the result that the outer portions of the antiskid elements are supported by one another to prevent instability of the tire tread. To provide contacting relationship as illustrated in Fig. 3, it is found that the space between the projections 9, as measured transversely of the tire tread, should be in the order of 1/16 inch. While the effectiveness of the lateral stability provided by the ribs or projections 9 will decrease as the tread becomes worn, the need for lateral stability decreases in proportion to the reduction in height of the antiskid elements; therefore, after the projections 9 are completely worn away, the proportion of the height of the antiskid elements relative to their width will be such that no lateral support is required.

By utilizing the lateral stabilizing means of my invention, it is possible to provide substantial increases in the height of the antiskid elements and to thereby obtain a correspondingly substantial increase in tread wear. In a 6.00–16 tire, I have provided antiskid elements having a height in the order of .555 inch, whereas in conventional practice, for a similar size tire, the height of the antiskid elements is limited to approximately .340 inch.

While it may be thought possible to obtain the benefits of the present invention by merely reducing the width of the tread grooves to a width as defined by the margins of adjacent projections 9, it is generally recognized that the width of the conventional grooves 8 cannot ordinarily be reduced because of the detrimental effect of cracking in the region of the base of the tread grooves.

From the foregoing disclosure, it is believed apparent that I have provided a unique proportionment of a tire tread for the purpose of obtaining better tread wear and increased tire performance, and while I have shown and described a preferred embodiment of my invention, it is to be understood that it is susceptible of modifications, particularly with respect to the tread pattern, and that such modifications are contemplated within the spirit of the invention and scope of the appended claims.

Having thus shown and described my invention, what I claim and desire to protect by Letters Patent is:

1. A tire tread comprising a plurality of functionally continuous circumferentially extending ribs, lateral projections of substantial marginal thickness adjacent the ground engaging surfaces of the ribs and extending into grooves defined by the ribs, the lateral dimensions of said projections being such as to form contact with adjacent units when under load and in engagement with a supporting surface.

2. A tire tread comprising a plurality of antiskid elements each having a height greater than its width, lateral projections of substantial marginal thickness adjacent the ground engaging surfaces of the antiskid elements and extending into grooves defined by the antiskid elements, the lateral dimensions of said projections being such as to form contact with adjacent units when under load and in engagement with a supporting surface.

3. A tire tread comprising a plurality of functionally continuous circumferentially extending ribs having heights greater than their widths, lateral projections of substantial marginal thickness adjacent the ground engaging surface of the ribs and extending into grooves defined by the ribs, the lateral dimensions of said projections being such as to form contact with adjacent units when under load and in engagement with a supporting surface.

4. A tire tread comprising a plurality of circumferentially extending antiskid elements defined by grooves, contiguous over-hanging ribs of substantial marginal thickness adjacent the ground engaging surfaces of the anti-skid elements and extending into the grooves, the lateral dimensions of said contiguous ribs being such as to form contact with adjacent units when under load and in engagement with a supporting surface.

5. A tire tread comprising a plurality of circumferentially extending antiskid elements having heights greater than their widths, contiguous over-hanging ribs of substantial marginal thickness adjacent the ground engaging surface of the anti-skid elements and extending into the grooves defined between the antiskid elements, the lateral dimensions of said contiguous ribs being such as to form contact with adjacent units when under load and in engagement with a supporting surface.

6. A tire tread comprising a plurality of antiskid elements each having a height greater than its width, lateral projections adjacent the ground engaging surface of the antiskid elements and extending into grooves defined between the antiskid elements, the thickness of the lateral projections being equal to at least one-quarter of the height of the antiskid elements, the lateral dimensions of said projections being such as to form contact with adjacent units when under load and in engagement with a supporting surface.

7. A tire tread comprising a plurality of circumferentially extending functionally continuous ribs having a height greater than their width, overhanging portions of substantial thickness extending from the ribs adjacent the ground engaging surface thereof and extending into grooves defined by the ribs, said overhanging portions being spaced apart circumferentially to provide openings forming communications between the ground engaging surface of the tread and the tread grooves, and the lateral dimensions of said overhanging portions being such as to form contact with corresponding overhanging portions on adjacent ribs when under load and in engagement with a supporting surface.

8. A tire having a tread comprising a plurality of tread elements separated by grooves at least some of which extend in undercut relation into the sides of the elements to provide lesser width of the elements at the undercut portions thereof than at their faces, the undercut portions terminating short of the extent of such elements.

9. A tire having a tread comprising a plurality of circumferentially continuous ribs separated by grooves, said ribs having relatively stable spaced-apart portions of substantially the same width for the extent of their depth, and intervening portions into which the grooves extend in undercut relation providing relatively unstable portions.

ARTHUR W. BULL.